(12) United States Patent
Shamoto (10) Patent No.: US 7,812,762 B2
(45) Date of Patent: Oct. 12, 2010

(54) RELATIVE INTER-VEHICLE POSITION CALCULATION APPARATUS, TRANSMISSION APPARATUS AND PROGRAM FOR SAME

(75) Inventor: Michio Shamoto, Konan (JP)

(73) Assignee: Denso Corporation, Kariya (JP)

( * ) Notice: Subject to any disclaimer, the term of this patent is extended or adjusted under 35 U.S.C. 154(b) by 37 days.

(21) Appl. No.: 12/313,728

(22) Filed: Nov. 24, 2008

(65) Prior Publication Data

US 2009/0140916 A1   Jun. 4, 2009

(30) Foreign Application Priority Data

Dec. 4, 2007   (JP) .............................. 2007-313279

(51) Int. Cl.
   *G01S 19/43*   (2010.01)
(52) U.S. Cl. ................................. 342/357.26
(58) Field of Classification Search ............ 342/357.02, 342/357.03, 357.06, 357.08; 701/213, 215
   See application file for complete search history.

(56) References Cited

U.S. PATENT DOCUMENTS 5,999,880 A   12/1999   Okada et al.

FOREIGN PATENT DOCUMENTS

| JP | 4-195600 | 7/1992 |
|---|---|---|
| JP | 07-055912 | 3/1995 |
| JP | 08-304092 | 11/1996 |
| JP | 10-082848 | 3/1998 |
| WO | WO 2006/043123 | 4/2006 |

OTHER PUBLICATIONS

Hiroshi Isshiki, "Observation Equation", May 5, 2003.
Shinya Okamoto, study on "The Positioning Accuracy of Long Baseline Code-DGPS and Carrier-Phase-DGPS", Tokyo University of Mercantile Marine, 2003.
Tomoji Takasu, "Precise Positioning Theory and Analysis With Carrier-phase Measurements", Sep. 25, 2007.
Office action dated Dec. 1, 2009 in corresponding Japanese Application No. 2007-313279.

*Primary Examiner*—Dao L Phan
(74) *Attorney, Agent, or Firm*—Harness, Dickey & Pierce, PLC (57) ABSTRACT

An on-board communication equipment on each of two vehicles receives a radio wave from two or more GPS satellites, and determines a carrier wave phase of the received radio wave. Then, the on-board communication equipment on one vehicle receives, from the other vehicle, information on the carrier wave phase observed in the other vehicle. Further, the on-board communication equipment calculates a relative position of a self vehicle relative to the other vehicle by a Carrier-Phase DGPS positioning based on a difference between two carrier wave phases (e.g., single difference, double difference or the like), that is, one from the self vehicle and one from the other vehicle, both having the same observation time, from among the available carrier wave phases.

10 Claims, 6 Drawing Sheets

RELATIVE INTER-VEHICLE POSITION CALCULATION APPARATUS, TRANSMISSION APPARATUS AND PROGRAM FOR SAME

CROSS REFERENCE TO RELATED APPLICATION

The present application is based on and claims the benefit of priority of Japanese Patent Application No. 2007-313279 filed on Dec. 4, 2007, the disclosure of which is incorporated herein by reference.

FIELD OF THE INVENTION

The present disclosure generally relates to a calculation apparatus for calculation of relative inter-vehicle position, a transmission apparatus for transmitting information to the calculation apparatus, and a program for use in the calculation apparatus and the transmission apparatus.

BACKGROUND INFORMATION

A conventional technique for calculating a relative position between two vehicles based on a signal from navigation satellites is disclosed in a Japanese patent document JP-3,681,241 (also available as U.S. Pat. No. 5,999,880) for example. In the document, two vehicles respectively receive the signal from the GPS satellites for calculating signal transmission time (that is reversely proportional to a pseudo-distance) from the satellites to the vehicles. Then, one of the two vehicles, that is, the first vehicle, acquires a radio wave propagation time that is calculated on the second vehicle through an inter-vehicle communication, and the relative position of the first vehicle against the second vehicle is determined based on a difference between two radio wave propagation times on the first and second vehicles.

However, a relative position calculation method that calculates the relative position based on the difference between two radio wave propagation times derived from the signal transmission time has a calculation error ranging from several meters up to scores of meters, which is not sufficient for a specific purpose.

SUMMARY OF THE INVENTION

In view of the above and other problems, the present disclosure provides a technique for calculating a relative position of two vehicles based on a signal from navigation satellites with improved calculation precision.

In an aspect of the invention, a relative inter-vehicle position calculation apparatus for use in a first vehicle includes: a phase determination unit for determining a carrier wave phase of a radio wave through reception of the radio wave from a plurality of navigation satellites, wherein the carrier wave phase is determined as a first carrier wave phase; a phase information reception unit for receiving information on the carrier wave phase from a second vehicle that receives the radio wave from the plurality of navigation satellites and transmits the information on the carrier wave phase (i.e., the second carrier wave phase); and a calculation unit for calculating a detailed relative position of the first vehicle relative to the second vehicle based on a difference between the second carrier wave phase being received from the second vehicle and the first carrier wave phase being determined on the first vehicle.

The method described above, that is, the calculation of the relative position of a vehicle based on the difference between the carrier wave phases from the first and the second vehicles, is designated as a Carrier-Phase DGPS positioning. The Carrier-Phase DGPS positioning enables the improvement of the precision of calculation of the relative position up to one meter or less, or further to an order of millimeters, which is a great improvement compared to the conventional technology.

BRIEF DESCRIPTION OF THE DRAWINGS

Other objects, features and advantages of the present invention will become more apparent from the following detailed description made with reference to the accompanying drawings, in which.

DETAILED DESCRIPTION

First Embodiment

Hereafter, the first embodiment of the present invention is described.

Figure 1:
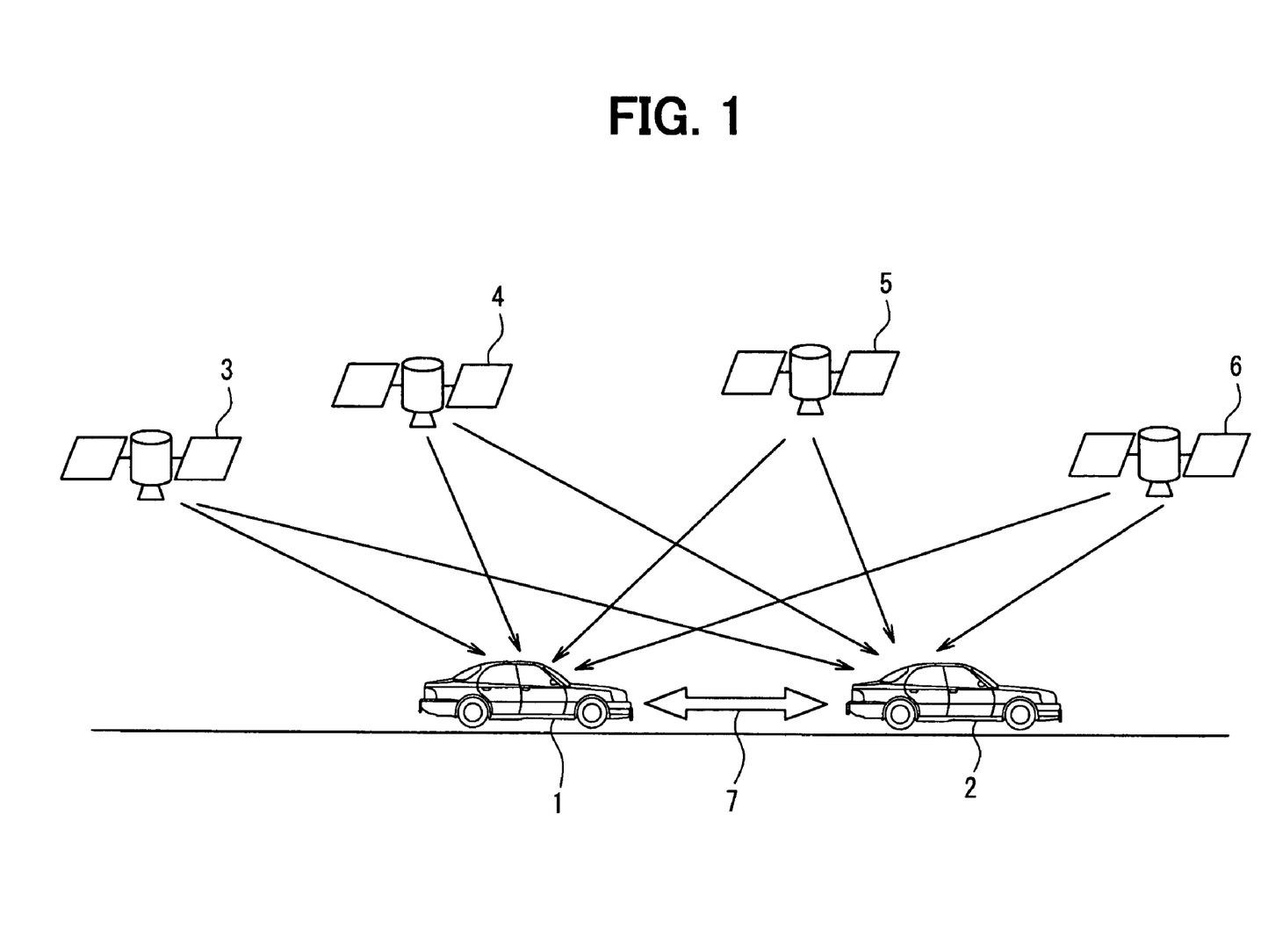
FIG. 1 is an illustration of a communication system according to a first embodiment of the present invention.

FIG. 1 shows the diagrammatic illustration of the telecommunication system according to the embodiment. In the present embodiment, vehicles 1 and 2 receive a radio wave (L1 band carrier wave) from two or more GPS satellites 3 to 6, and information on a carrier wave phase and the like of the received radio wave is exchanged mutually between the vehicles as indicated by an arrow 7. The difference between the carrier wave phase of the radio wave received by one of the vehicles and the carrier wave phase received by the other vehicle is then determined, and the relative position between the vehicles 1 and 2 is determined on the basis of the difference. In FIG. 1, the number of available GPS satellites for the vehicles 1 and 2 is 4, the number of the satellites may be only 3, or the number may be 5 or more depending on the situation.

Figure 2:
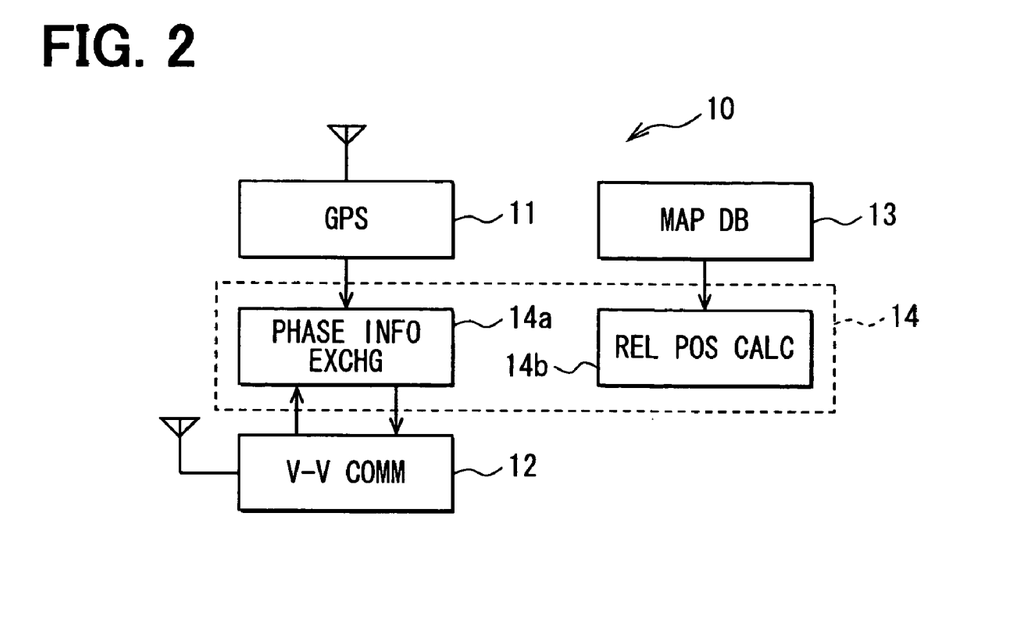
FIG. 2 a block diagram of a configuration of an on-board communication equipment.

For realizing the function of the present invention, an on-board communication equipment 10 (corresponding an example of a relative inter-vehicle position calculation apparatus as well as an example of a transmission apparatus) shown in FIG. 2 is installed respectively on the vehicle 1 and the vehicle 2. The on-board communication equipment 10 has a GPS receiver 11, an inter-vehicle communication unit 12, a map database 13, and a control unit 14.

The GPS receiver 11 receives the radio wave from the GPS satellites 3 to 6 according to the control of the control unit 14. The GPS receiver 11 determines a pseudo-distance included in the carrier wave phase of the received radio wave and the radio wave itself, navigation data included in the radio wave such as an ephemeris, satellite clock information, ionosphere compensation data, an almanac and the like, and a dilution of precision (DOP) value (more practically, an HDOP value that represents the precision of positioning in the horizontal direction) included in the radio wave, and outputs information to the control unit 14.

The inter-vehicle communication unit 12 is a device in a vehicle (i.e., the vehicle that is equipped with the apparatus 10) that has functions of amplification, frequency conversion, modulation/demodulation and the like to communicate wirelessly with surrounding vehicles.

The map database 13 is a storage medium that memorizes data for representing the composition of the road. The road composition data includes inter-connection relationship of multiple roads and an intersection as well as positioning, surrounding objects such as buildings, trees and the like.

The control unit 14 is a device such as microcomputers that execute programmed processing. In the present embodiment, the control unit 14 achieves a phase and information sending and receiving (exchanging) function 14a and a relative position calculation function 14b.

The phase and information sending and receiving function 14a are functions to acquire information on the carrier wave phase and the like of the vehicle, to transmit the acquired information on the carrier wave phase and the like of the vehicle to another vehicle, and to receive information on the carrier wave phase and the like of the another vehicle by controlling the GPS receiver 11 and the inter-vehicle communication unit 12. The relative position calculation function 14b is a function to determine a relative position to the vehicle besides the vehicle on the basis of information acquired by phase information sending and receiving function 14a.

Figure 3:
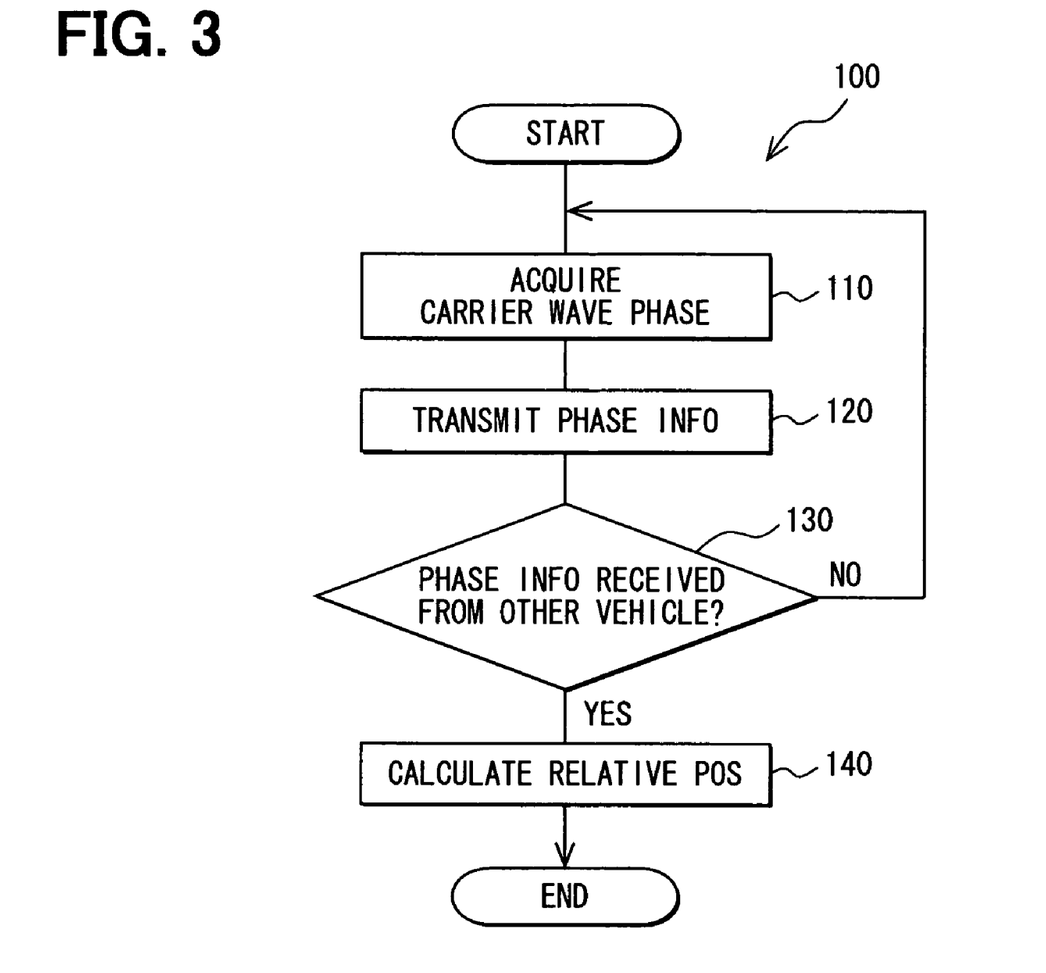
FIG. 3 is a flow chart of a program that a control unit of the on-board communication equipment executes.

The control unit 14 achieves each of the above-mentioned functions by repeatedly executing a program 100 shown in FIG. 3. When the program 100 is executed, the control unit 14 first controls the GPS receiver 11 in step 110, and acquires information on the carrier wave phase and the like of the vehicle. The information on the carrier wave phase and the like acquired in step 110 is, more practically, an observation time of the carrier wave phase, the number of available GPS satellites, a list of satellite numbers for identifying the satellites, and the carrier wave phase of each of the available satellites.

Further, in step 110, by acquiring information on the pseudo-distance and the like from the GPS receiver 11 and using the acquired pseudo-distance, a rough position of the vehicle (including information on a travel direction of the vehicle: same applies in the following description) by the point positioning is determined and the precision of the point positioning (i.e., the DOP value) is acquired. The control unit 14 stores the information acquired in step 110 for a certain period in a storage medium (e.g., in a RAM).

The inter-vehicle communication unit 12 is then controlled and the information on the acquired carrier wave phase and the like is transmitted to another vehicle voluntarily in step 120. The transmission of the information may be a transmission that restricts destination on-board communication equipments, or may be a transmission in a broadcast form that does not limit the destination on-board communication equipments.

Figure 4:
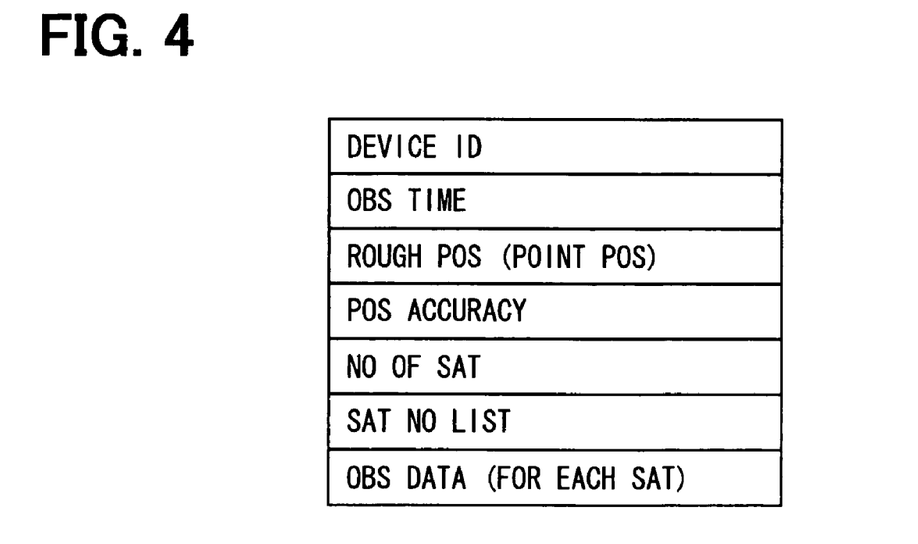
FIG. 4 is a diagram of information contents of a carrier wave phase and the like that the control unit transmits.

The information on the carrier wave phase and the like transmitted in step 120 contains an on-board equipment ID (i.e., a device ID) that serves as identification data to distinguish the on-board communication equipment 10 from other equipments 10 (i.e., from the equipments 10 on other vehicles) as well as information on the observation time, the number of GPS satellites, the GPS satellites list, the carrier wave phase of each of the satellites, the rough position by the point positioning and the precision of positioning acquired in step 120. The device ID of the equipment 10 for the transmission of information is recorded in the control unit 14 in advance. The contents of information such as the carrier wave phase and the like that is transmitted by the control unit 14 are shown in FIG. 4.

As shown in steps 110 and 120, the information on the number of GPS satellites, the GPS satellites list, the carrier wave phase of each of the satellites, the rough position by point positioning, positioning precision, and information on the on-board equipment ID will be transmitted from the vehicles 1 and 2 that are equipped with the on-board communication equipment 10. In the above case, the information on the carrier wave phase and the like that is transmitted by each of the on-board communication equipments 10 in one transmission sequence may be the above-mentioned information derived at one observation timing, or may be a bundle of the above-mentioned information derived at two or more observation timings.

Then, in step 130, whether the information on the carrier wave phase and the like by the communication unit 12 is received or not is determined. If the information is not received, step 110 is repeated. If the information has been received, the process proceeds to step 140.

In step 140, on the basis of the information on the carrier wave phase and the like received from other vehicle in step 130 and the information on the carrier wave phase and the like acquired and recorded in step 120, three-dimensional vehicle position of the own vehicle relative to the other vehicle is calculated.

Among the information received from other vehicle, the information that is actually used for calculation is the information that has the same observation time as the information stored by the control unit 14 of the own vehicle. Further, the information actually used for calculation is based on three or more commonly observed GPS satellites in the observation on one vehicle (i.e., the own vehicle) and on the other vehicle. In the following description, a pair of information on the carrier wave phase and the like derived from the own vehicle and from the other vehicle is designated as calculation phase information.

The calculation of a relative position of the vehicle relative to the other vehicle is specifically achieved by the technique of a well-known Carrier-Phase DGPS positioning by using the difference between the carrier wave phase in the calculation phase information received from the other vehicle and the carrier wave phase in the information of the own vehicle (e.g., a single phase difference, a double phase difference).

A specific method of the Carrier-Phase DGPS positioning such as Float solution method, Fix solution method, and On-the-fly (OTF) method to decide the integer value bias is described in, for instance, the following documents A to C. That is, "Float solution" of the integer value bias can be obtained if the calculation, by the expression ($25a/b$) and following expressions in the document A is used. When the calculation of the phase information at multiple timings is required, the control unit 14 waits until the required number of information is collected. That is, the relative position is calculated by the control unit 14 when the required number of information is collected.

Document A: "Observation equation" by Hiroshi ISSIKI, Jul. 9, 2003 (Search performed on Nov. 27, 2007), the location of the document <URL: http://www.dab.hi-ho.ne.jp/is-shiki/tokuron/lecnote/kansoku.pdf>

Document B: "Study on the positioning precision of a long base-line DGPS positioning and Carrier-Phase DGPS positioning" by Shin-ya OKAMOTO, pages 57 to 69, 2003 (Search performed on Nov. 27, 2007), the location of the document <http://www.denshi.e.kaiyodai.ac.jp/paper/2003/okamoto.pdf>

Document C: "Theory and analysis process of precise positioning by the measurement of carrier wave phase (WEB version)" by Tomoji TAKASU, Jun. 12, 2003, (Search performed on Nov. 27, 2007), the location of the document <http://gpspp.sakura.ne.jp/tutorial/html/gps_symp_2005_1.htm>

The Carrier-Phase DGPS positioning is understood as a positioning method that a relative position of a user is calculated relative to a fixed station having authorized position coordinates. The principle is (1) the carrier wave phase is determined at the fixed station and at the user's position at the same time, (2) the difference of the two phases from the same satellites (i.e., path difference) is used to calculate a baseline vector from the fixed station, and (3) the coordinates of the user is then calculated based on the baseline vector that points to the user's position relative to the fixed station. (Refer to the document A on page 57. The same contents are also disclosed in the documents B and C.)

As described in all of the above reference documents A to C, the on-board communication equipments 10 on the vehicles 1 and 2 receive the radio wave from the multiple satellites 3 to 6, and determine the carrier wave phase of the received wave. The carrier wave phase of the received wave corresponds to an example of the first carrier wave phase. Then, the equipment 10 receives the information on the carrier wave phase observed in the other vehicle (i.e., an example of the second carrier wave phase) in step 130 in FIG. 3. For example, the vehicle 1 receives, from the vehicle 2, the information on the carrier wave phase observed in the vehicle 2, and the vehicle 2 receives, from the vehicle 1, the information on the carrier wave phase observed in the vehicle 1.

The on-board communication equipment 10 then calculates a relative position (Correspond to an example of a detailed relative position) relative to the other vehicle by the method of the Carrier-Phase DGPS positioning on the basis of the difference (i.e., the single phase difference, the double phase difference) between the carrier wave phase from the other vehicle and the carrier wave phase of the own vehicle, both having the same observation time from among the available carrier wave phases, in step 140.

By using the Carrier-Phase DGPS positioning technique described above, the precision of calculation of the relative position between the vehicles is improved relative to the conventional method, because the achieved precision of the relative position calculation by the Carrier-Phase DGPS is in an order of millimeters to one meter depending on the number of the available satellites.

Moreover, each of the on-board communication equipments 10 on the vehicles 1 and 2 receives the radio wave from the GPS satellites 3 to 6, determines the carrier wave phase of the received wave (refer to step 110), and transmits, to the on-board communication equipment 10 on the other vehicle, the determined carrier wave phase (corresponding to an example of the second carrier wave phase: refer to step 120) for achieving the operation of the present embodiment.

Figure 5:
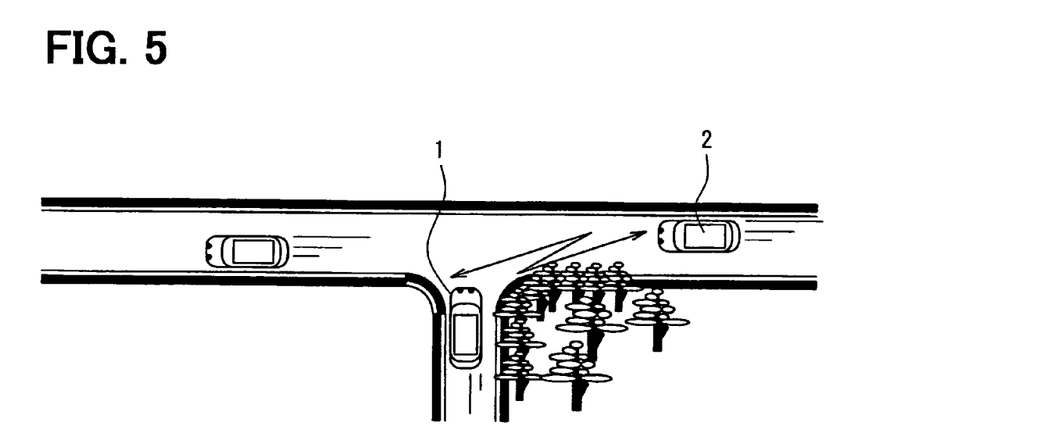
FIG. 5 is an illustration of a situation to which the communication system of the first embodiment is applied.
Figure 6:
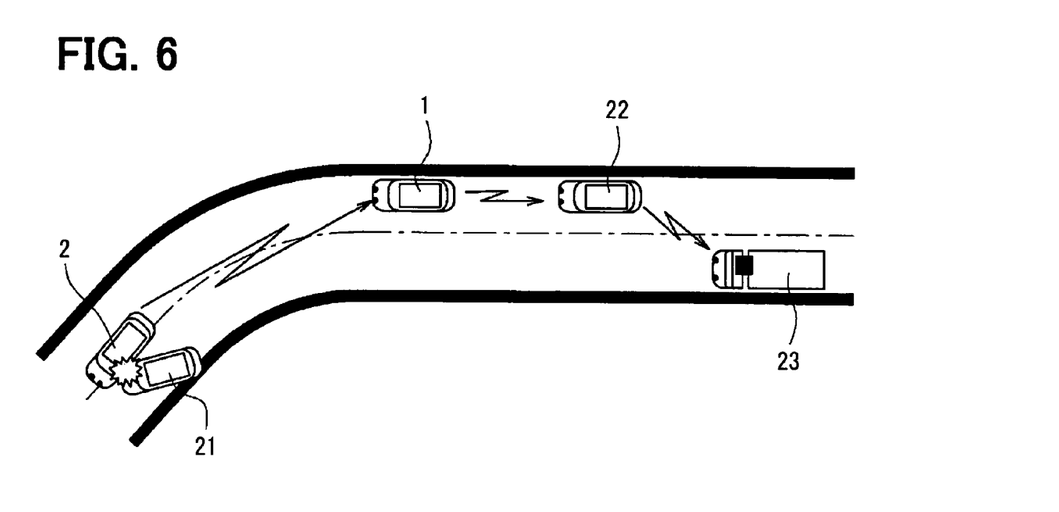
FIG. 6 is another illustration of a situation to which the communication system of the first embodiment is applied.

FIG. 5 and FIG. 6 show an example of the usage of the information on the relative position between the vehicles calculated in the above-described manner. In the example of FIG. 5, the vehicle 1 and the vehicle 2 mutually exchange information on the carrier wave phase and the like, and a relative position of the vehicle 1 relative to the vehicle 2 is calculated by the equipment 10 on the vehicle 1. Likewise, a relative position of the vehicle 2 relative to the vehicle 1 is calculated by the on-board communication equipment 10 on the vehicle 2. Then, if the inter-vehicle distance between the vehicle 1 and the vehicle 2 is smaller than a standard distance (for instance, smaller than 20 meters), the on-board communication equipment 10 controls an in-vehicle warning device (not shown in the figure) to warn a driver in the own vehicle.

In the above example, the information on the carrier wave phase and the like is exchanged bi-directionally between the vehicle 1 and vehicle 2. However, the phase information may be transmitted only in one way. That is, the vehicle 2 may only transmit the information on the carrier wave phase and the like, and the vehicle 1 may only receive the information on the carrier wave phase and the like and perform the relative position calculation based on the received information.

In the example of FIG. 6, when the on-board communication equipment 10 of the vehicle 2 which collided with a vehicle 21 has detected a collision with the vehicle 21 based on a signal from a collision detector not shown in the figure, the equipment 10 on the vehicle 2 transmits the information on the carrier wave phase and the like and accident happening information of the vehicle 2 to the on-board communication equipment 10 on the vehicle 1. The on-board communication equipment 10 on the vehicle 1 calculates a relative position of the vehicle 1 relative to the vehicle 2 by using the difference between the information on the carrier wave phase and the like from the vehicle 2 and the information on the carrier wave phase and the like of the own vehicle. Then, the on-board communication equipment 10 transmits the relative position information and the accident happening information to a following vehicle 22. The vehicle 22 relays the information further to a following vehicle 23. In this manner, the accident information and the relative position information are passed to the following vehicles one after another.

The calculation of the relative position is based basically on the difference between the first carrier wave phase and the second carrier wave phase as recited in the appended claims. However, the carrier wave phase difference may alternatively be derived from time-based calculation.

Second Embodiment

The second embodiment of the present invention is described in the following. The difference of the present embodiment from the first embodiment is that the control unit 14 of the on-board communication equipment 10 (Correspond to an example of the relative inter-vehicle position calculation apparatus) installed in the vehicle 1 repeatedly executes a program 200 shown in FIG. 7 in place of the program 100 of FIG. 3. The difference further includes the repeated execution of a program 300 in FIG. 8 by the control unit 14 in the on-board communication equipment 10 (Correspond to an example of a transmission apparatus) installed in the vehicle 2 in place of the execution of the program 100 of FIG. 3. According to the operation scheme described above, the on-board communication equipment 10 on the vehicle 2 only transmits information without receiving the information on the carrier wave phase and the like from the other vehicle, and the communication equipment 10 on the vehicle 1 only receives the information without transmitting the information on the carrier wave phase to the other vehicle.

Figure 7:
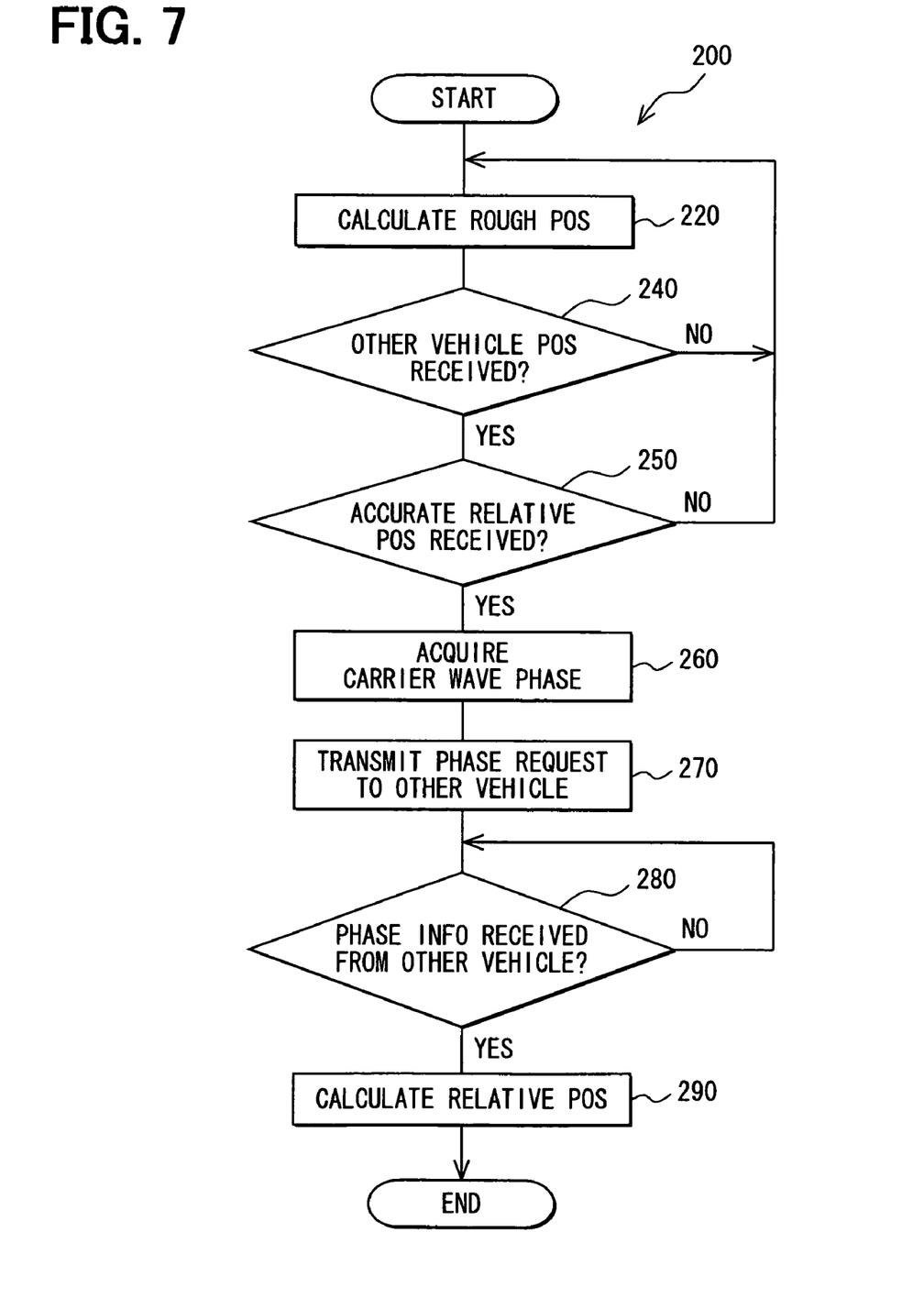
FIG. 7 is a flow chart of another program that the control unit of the communication equipment on a receiving side executes in a second embodiment.
Figure 8:
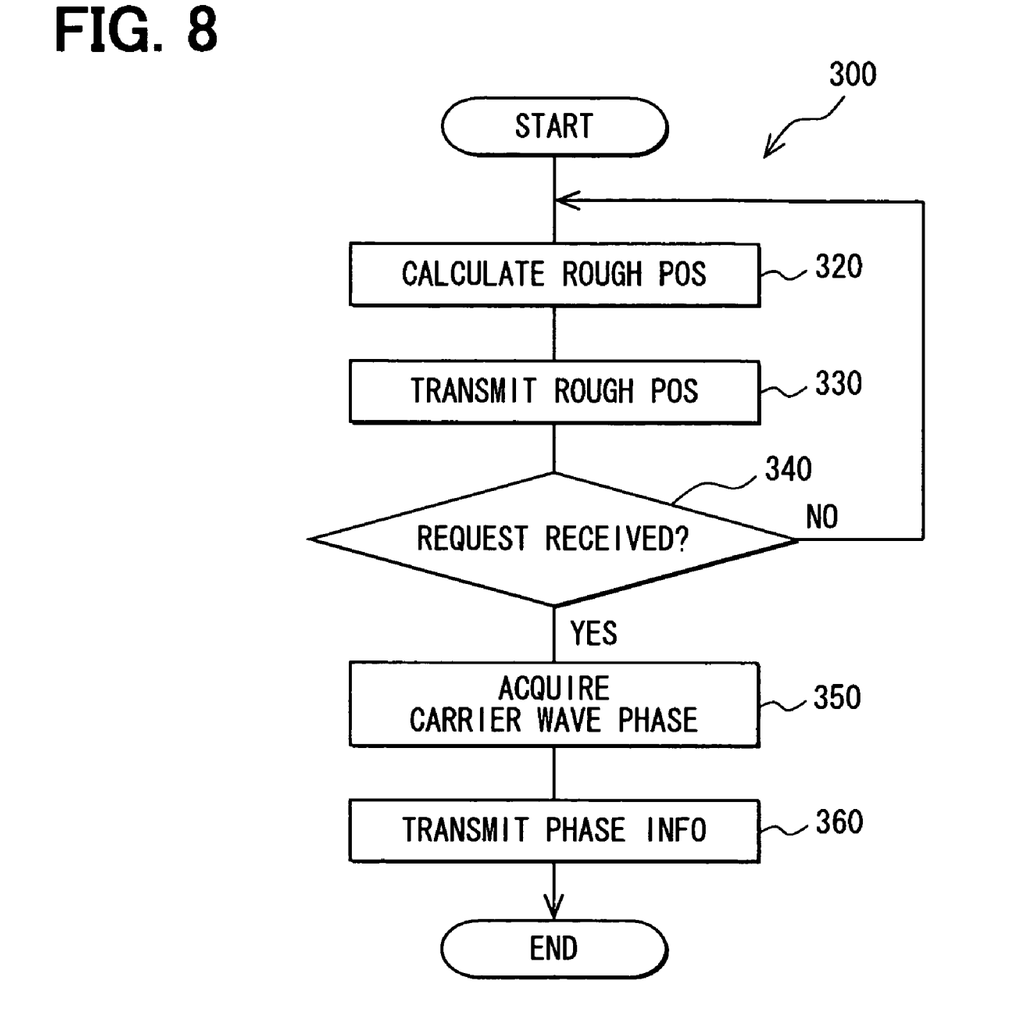
FIG. 8 is a flow chart of yet another program that the control unit of the communication equipment on a transmitting side executes.

Hereafter, the operation of the on-board communication equipment 10 of reception side vehicle 1 and the on-board communication equipment 10 of transmission side vehicle 2 are described by using FIG. 7 and FIG. 8. In the following description, the on-board communication equipment 10 and the control unit 14 installed in the reception side vehicle 1 are respectively designated as the receiving equipment 10 and each the receiving unit 14, and the on-board communication equipment 10 and the control unit 14 installed in the transmission side vehicle 2 are respectively designated as the transmitting equipment 10 and the transmitting unit 14.

First, the transmitting unit 14 calculates the rough position of the vehicle 2 (i.e., latitude, longitude, and altitude) by point positioning based on the signal from the GPS satellites from 3 to 6 received by the GPS receiver 11 in step 320 of the program 300. Because the rough position is based on positioning by the point positioning method, the precision is less than several meters, which is not precise as the precision of the relative position calculated by the method of the Carrier-Phase DGPS positioning.

The transmitting unit 14 then transmits the rough position of the vehicle 2 that is calculated immediately beforehand to the other vehicle by using the inter-vehicle communication unit 12 in step 330. The destination of transmission may be restricted to the vehicle 1, or the transmission may be a broadcast form that does not limit the transmission destination. The rough position to be transmitted includes the device ID of the transmitting equipment 10 in this case.

The control unit 14 then determines in step 340 whether a request signal of the information on the carrier wave phase and the like from the other vehicle through the inter-vehicle communication unit 12. If the request has not been received, the process repeats execution of step 320. Thus, the control unit 14 will wait for the request signal of the information on the carrier wave phase and the like from the other vehicle while repeating the calculation and transmission of the rough position of the vehicle 2.

On the other hand, the receiving unit 14 in the reception side vehicle 1 first calculates the rough position of the vehicle 1 (latitude, longitude, and altitude) by point positioning based on the signal and the like that is received from the satellites 3 to 6 by the receiver 11 in step 220 of the program 200.

The receiving unit 14 then determines whether the rough position transmitted from the other vehicle has been received through the inter-vehicle communication unit 12 in step 240. If the position has not been received, step 220 is executed again. If the rough position has been received, the process proceeds to step 250. Thus, the control unit 14 will wait for information on the rough position from the other vehicle while repeating the calculation of the rough position of the vehicle 1.

When the rough position transmitted from the transmission side vehicle 2 is received, the receiving unit 14 determines in step 250 whether the calculation of a relative position of the reception side vehicle 1 relative to the transmission side vehicle 2 is required. The determination is performed specifically on the basis of at least one of the following determination conditions 1 to 3.

(Condition 1: The DOP value of the GPS satellite is lower than the standard DOP value)

Here, the condition 1 corresponds to a condition of sufficient precision of positioning by the GPS satellites because a smaller DOP value represents a higher positioning precision. The standard DOP value may be a constant value (for instance, 50 meters, 100 meters or the like) that is pre-stored in a memory, may be a variable value that varies depending on various conditions, or may even be a random value in a certain value range. For instance, the standard DOP value may be a value that is determined based on the rough positions of the vehicles 1 and 2 with the increase of the value in proportion to the closeness of the vehicles 1 and 2. That is, in other words, the standard DOP value may be the value that allows the deterioration of the precision of positioning when the vehicle 1 and 2 come closer to each other.

(Condition 2: The distance between the vehicles 1 and 2 being smaller than the first standard distance that is determined by the rough positions of the reception side vehicle 1 and the transmission side vehicle 2)

Here, the first standard distance may be a pre-memorized constant value (for instance, 50 meters, 100 meters or the like), may be a variable value that varies depending on various conditions (e.g., an increasing value that increases in proportion to the speed of the vehicle 1), or may even be a random value in a certain value range.

(Condition 3: Collision of the reception side vehicle 1 and the transmission side vehicle 2 is not possible due to road structure)

"Collision of the reception side vehicle 1 and the transmission side vehicle 2 is not possible due to road structure," indicates that the vehicle 1 and the vehicle 2 are traveling on two different roads, and the two different roads do not cross with each other within the second standard distance ahead of the traveling positions of the vehicle 1 and the vehicle 2 in the traveling direction of the vehicles 1 and 2. The second standard distance may be a pre-memorized constant value (for instance, 100 meters, 200 meters or the like), may be a variable value that varies depending on various conditions (e.g., an increasing value that increases in proportion to the speed of the vehicle 1), or may even be a random value in a certain value range.

In the above determination, the roads on which the vehicles 1 and 2 are traveling may be determined by a well-known map matching technology that uses the road composition data in the map database 13 together with the rough current position.

The transmitting unit 14 may only have to specify the information on the traveling road where the vehicle 2 is traveling on the basis of information received from a beacon in the proximity of the vehicle 2 and to transmit the specified information together with the rough position if the beacon for wirelessly transmitting road information is installed along the road. Moreover, in that case, the receiving unit 14 may determine on which road the vehicle 1 is travelling based on the information received from the beacon and on which road the vehicle 2 is traveling based on the road information received from the transmission side vehicle 2.

Moreover, whether the two roads cross with each other within the second standard distance in the traveling direction of the roads from the vehicles 1 and 2 is determined on the basis of the road composition data in the map database 13.

The determination in step 250 may only be affirmed when all of the conditions 1 to 3 are fulfilled, or may be affirmed when at least one of the conditions 1 to 3 is fulfilled. For instance, the determination may lead to an affirmative result when the conditions 2 and 3 only are fulfilled, while leading to a negative result when one of the two conditions 2 and 3 is not fulfilled. For example, while the vehicles 1 and 2 are traveling on two parallel roads that extend in parallel in the proximity of the other road without intersecting, the information on the carrier wave phase and the like is not transmitted even if the vehicles 1 and 2 come close to each other, thereby decreasing the process load due to the transmission/reception of the phase information and the calculation of the relative position.

The process proceeds to step 260 when the determination result of step 250 is affirmative. If the result of step 250 is negative, step 220 is executed again. Therefore, the receiving unit 14 repeats processing of steps 220, 240 until the calculation of a relative position of the vehicle 1 to the other vehicle is required.

The receiving unit 14 acquires the carrier wave phase of the vehicle 1 in step 260 when the calculation of a relative position of the vehicle 1 is determined to be required. The contents of the processing of the step 260 are same as the processing contents in step 110 in FIG. 3 in the first embodiment.

The request signal to request for the carrier wave phase information is, in step 270, transmitted to the vehicle 2 that is an origin of transmission of the rough position received in step 240 immediately before step 270. The origin of the transmission of the rough position is determined based on the device ID that is included in the received information on the rough position. Moreover, the device ID of the receiving equipment 10 is included in the transmitted request signal as the origin of transmission. Then, step 280 waits for the information on the carrier wave phase and the like from the destination of the transmission to which the request signal is transmitted until the information is received.

On the other hand, the transmitting unit 14 in the transmission side vehicle 2 then acquires the information on the carrier wave phase and the like in step 350 after having the affirmative determination result in step 340 due to the reception of the request signal from the reception side vehicle 1. The contents of the processing of step 350 are same as the processing contents in step 110 in FIG. 3 in the first embodiment.

Then, the information on the carrier wave phase and the like in the vehicle 2 acquired immediately beforehand is transmitted to the transmission side vehicle 2 in step 360. The contents of the processing of the step 360 are same as the processing contents in step 120 in FIG. 3 in the first embodiment. However, the destination of the information on the carrier wave phase and the like is limited to the reception side vehicle 1. More practically, the device ID of the receiving equipment 10 is included in the information on the carrier wave phase and the like as a destination address.

The receiving unit 14 in the reception side vehicle 1 receives the information on the carrier wave phase and the like transmitted from the transmitting unit 14 to the own vehicle in step 280. Then, in step 290, the three dimensional relative position of the reception side vehicle 1 relative to transmission side vehicle 2 is calculated on the basis of the information on the carrier wave phase and the like on the vehicle 1 determined in step 260 and the received carrier wave phase information of the other vehicle 2 by the method that is same as the method in step 140 in FIG. 3 in the first embodiment.

As mentioned above, the transmitting equipment 10 sends back the carrier wave phase to the vehicle 1 (see step 360) after acquiring the wave phase from the GPS satellites 3 to 6 based on the observation in the vehicle 2 when the rough position of the vehicle 2 is calculated (see step 320) and is transmitted (see step 330) and the request signal of the information on the carrier wave phase and the like is received from the other vehicle 1 (see step 350) afterwards.

Moreover, the receiving equipment 10 calculates the rough position of the own vehicle 1 (see step 220) and receives the rough position of the vehicle 2 (see step 240), and then determines whether the calculation of the detailed relative position by the Carrier-Phase DGPS positioning is required on the basis of the rough positions and the like of the vehicle 1 and the vehicle 2 (see step 250).

Then, the carrier wave phase observed in the vehicle 1 is acquired when it is determined that the calculation of the detailed relative position is required (see step 260), and the carrier wave phase is received (see step 280) after transmitting a request to the vehicle 2 that is the transmission origin of the rough position (see step 270). Then, the relative position by the Carrier-Phase DGPS positioning is calculated on the basis of the difference between the received carrier wave phase of the other vehicle 2 and the acquired carrier wave phase of the vehicle 1 (see step 290).

Thus, the receiving equipment 10 of the reception side vehicle 1 performs calculation of the Carrier-Phase DGPS positioning on the basis of the difference between the carrier wave phase of the reception side vehicle 1 and the transmission side vehicle 2. Therefore, the precision of the calculation improves relative to the conventional method because of the precision of the calculation of the relative position in an order of millimeters to less than one meter.

Moreover, the transmitting equipment 10 of the transmission side vehicle 2 determines the carrier wave phase of the radio wave received from the GPS satellites 3 to 6, and transmits the carrier wave phase to the reception side equipment 10 of the vehicle 1 for realizing the calculation function of a relative position of the reception side vehicle 1.

Moreover, in some cases, the receiving equipment 10 performs the calculation of the detailed relative position based on a condition that the rough distance between the reception side vehicle 1 and the transmission side vehicle 2 is smaller than the standard distance, and does not performs the calculation of the detailed relative position and relative processing based on a condition that the rough distance is greater than the standard distance.

By adopting the above-described operation scheme, the processing load of the receiving equipment 10 and the transmitting equipment 10 can be decreased efficiently by not requesting, sending and receiving the information on the carrier wave phase and the like as well as not performing the calculation of the detailed relative position when there is little possibility of collision due to a sufficient distance between the reception side vehicle 1 and the transmission side vehicle 2.

Moreover, based on the condition that there is no possibility of the collision of the reception side vehicle 1 with the transmission side vehicle 2 due to the structure of the road, the receiving equipment 10 is configured, in some cases, not to perform the calculation of the carrier wave phase and the related processing.

When adopting the above configuration, the processing load of the receiving equipment 10 and the transmitting equipment 10 can be efficiently decreased by not requesting, sending and receiving the information on the carrier wave phase and the like as well as not calculating the detailed relative position when the reception side vehicle 1 and the transmission side vehicle 2 are respectively traveling on the different roads that do not cause the collision of the two vehicles.

Moreover, the reception side vehicle 1 is configured, in some cases, not to perform the calculation of the detailed relative position and related processing on the basis of low precision of positioning (i.e., a low DOP value) by the GPS satellites 3 to 6 in the reception side vehicle 1.

When precision of the detailed relative position between the reception side vehicle 1 and the transmission side vehicle 2 is insufficient due to the above configuration, the processing load of the receiving equipment 10 and the transmitting equipment 10 can be efficiently decreased by not requesting, sending and receiving the information on the carrier wave phase and the like as well as not performing the calculation of the detailed relative position.

Other Embodiments

Although the present invention has been fully described in connection with the preferred embodiment thereof with reference to the accompanying drawings, it is to be noted that various changes and modifications will become apparent to those skilled in the art.

For instance, in step 330 of the program 300 in the second embodiment, the transmitting unit 14 in the transmission side vehicle 2 may transmit the navigation data received from the GPS satellites 3 to 6 to the reception side vehicle 1 together with the information of the rough position. Then, the receiving unit 14 in the reception side vehicle 1 may receive the navigation data, and may supplement the GPS satellites 3 to 6.

The operation scheme saves for the receiving equipment 10 the necessity to receive the navigation data from GPS satellites 3 to 6. The operation efficiency of the transmission side vehicle 2 improves greatly if the reception processing of the navigation data from the GPS satellites 3 to 6 becomes unnecessary, because the reception processing from the GPS satellites 3 to 6 takes a long time, that is, more than ten minutes. In contrast, the transmission of the navigation data though the inter-vehicle communication takes much shorter time compared with the reception from GPS satellites 3 to 6. Further, even when a part of the navigation data is transmitted through the inter-vehicle communication, the above-mentioned scheme still has advantageous effects.

Moreover, in the second embodiment, the transmitting unit 14 in the transmission side vehicle 2 may be able to determine the present vehicle position (hereafter, it is designated as an absolute position) on the earth by the same or higher level of precision than the Carrier-Phase DGPS positioning. For the requirement of the precision, a method such as a conventional Carrier-Phase DGPS positioning technology for determining the absolute position through a communication with a fixed standard station, a wireless beacon technology for receiving a detailed absolute position information from a beacon that is disposed along the road, or other similar method may be employed.

In that case, the transmitting unit 14 may transmit, in step 360 of the program 300, the absolute value to the reception side vehicle 1 together with the information on the carrier wave phase and the like of the vehicle 2. Further, the receiving unit 14 in the reception side vehicle 1 may calculate the absolute position of the vehicle 1 in higher precision based on the received absolute position of the transmission side vehicle 2 and the relative position calculated in step 290 of the program 200.

Therefore, by receiving the higher precision positioning data from the transmission side vehicle 2 and using the data in combination with the detailed relative position, the receiving equipment 10 can precisely determine the absolute position of the vehicle 1. The technique described above has its advantage when the receiving equipment 10 can not determine the detailed position of the vehicle despite the detailed position available on the transmitting equipment 10.

Moreover, in the second embodiment, the on-board communication equipment 10 of the vehicle 1 receives the information on the carrier wave phase and the like solely from the vehicle 2, and the on-board communication equipment 10 of the vehicle 2 transmits the information on the carrier wave phase and the like solely to the vehicle 1. However, the control unit 14 on each of the vehicles 1 and 2 may execute both programs 200 and 300 in parallel. In that case, the vehicle 1 and the vehicle 2 can mutually exchange the information on the carrier wave phase and the like as in the first embodiment.

Moreover, in the second embodiment, the receiving unit 14 may reverse the order of execution of step 270 and step 260. In that case, the receiving unit 14 may include information on the observation time set instruction of the carrier wave phase of the GPS satellites 3 to 6 in the request signal that is transmitted in step 270, and, then in step 260, the receiving unit 14 may wait for the specified observation time and may control the GPS receiver 11 at the observation time to acquire the carrier wave phase. Further, in that case, the transmitting unit 14 may wait for the specified observation time included in the received request signal, and may control the GPS receiver 11 at the observation time to acquire the carrier wave phase, and may transmit the acquired carrier wave phase to the vehicle 1. In this manner, timing synchronization regarding the acquisition of the carrier wave phase from the GPS satellites 3 to 6 can be performed between the receiving equipment 10 and the transmitting equipment 10.

Moreover, in the first embodiment, the on-board communication equipment 10 may be configured not to transmit the information on the rough position and on the precision of the rough position.

Moreover, each of the on-board communication equipments 10 may determine the integer value bias by using not only the L1 band carrier wave but also the L2 band carrier wave and the L5 band carrier wave in the above-mentioned embodiments.

Moreover, the receiving equipment 10 is configured not to transmit the request signal to the transmitting equipment 10 for suppressing useless transmission of the information on the carrier wave phase and the like by the transmitting equipment 10 when the receiving equipment 10 determines that the calculation of the detailed relative position is not required. However, even when the calculation of the detailed position is determined as not required, the receiving equipment 10 may receive the information on the carrier wave phase and the like from the transmission side vehicle 2 without performing the calculation of the detailed position.

When the information on the carrier wave phase and the like is configured to be transmitted to the transmitting equipment 10 without receiving the request signal, the receiving equipment 10 may transmit, to the transmitting equipment 10, an information transmission prohibition instruction for prohibiting the transmission of the information on the carrier wave phase and the like, and the transmitting equipment 10 may stop the transmission of the information on the carrier wave phase and the like according to the prohibition instruction.

When the information on the carrier wave phase and the like is configured to be transmitted by transmitting equipment 10 without receiving the request signal, the receiving equipment 10 may transmit the rough position information of the own vehicle 1 to the transmitting equipment 10, and the transmitting equipment 10 may voluntarily stop the transmission of the information on the carrier wave phase and the like when the transmitting equipment 10 determines that the calculation of the detailed relative position is not required based on the distance between the received rough position of the reception side vehicle 1 and the rough position of the own vehicle 2.

Moreover, the control unit 14 on each of the on-board communication equipment 10 may acquire the carrier wave phase of the radio wave of the selected GPS satellites for the calculation of the relative position by selecting an optimum satellite combination that yields the DOP value equal to or smaller than the predetermined value instead of acquiring the carrier wave phase from all observed GPS satellites.

Moreover, the on-board communication equipment 10 may configured to mutually transmit, to the other vehicle, the satellite combination information that results in the DOP value equal to or smaller than the predetermined value.

Moreover, the object satellites for which the carrier wave phase are determined may be different satellites, which are different from GPS satellites, such as GLONASS satellites, GALILEO satellites and other satellites for satellite navigation (GNSS) in the above-mentioned embodiment. In that case, different type satellites may be simultaneously used. That is, for example, the GPS satellites may be used together with the GLONASS satellites.

Moreover, each of the functions achieved by the execution of the programs by each of the control units 14 may alternatively be achieved by using hardware such as a field programmable gate array (FPGA) that can be programmed to implement a specific circuitry.

Moreover, the GPS receiver 11 and the control unit 14 may be integrally implemented as one-body hardware.

Such changes and modifications are to be understood as being within the scope of the present invention as defined by the appended claims.

What is claimed is:

1. A relative inter-vehicle position calculation apparatus for use in a first vehicle, the apparatus comprising:
    a control unit having a phase determination unit, a phase information reception unit, and a calculation unit;
    an inter-vehicle communication unit for performing an inter-vehicle communication with a second vehicle; and
    a receiver for receiving from a plurality of navigation satellites a radio wave, wherein
    the phase determination unit determines a carrier wave phase of the radio wave through reception of the radio wave from the plurality of navigation satellites, the carrier wave phase being determined as a first carrier wave phase,
    the phase information reception unit receives, by the inter-vehicle communication unit, information on the carrier wave phase from the second vehicle that (a) receives the radio wave from the plurality of navigation satellites and (b) transmits the information on the carrier wave phase together with navigation data included in the radio wave, the received information on the carrier wave phase being determined as a second carrier wave phase,
    the calculation unit calculates a detailed relative position of the first vehicle relative to the second vehicle based on a difference between (a) the second carrier wave phase being received by the phase information reception unit and (b) the first carrier wave phase being determined by the phase determination unit based on the navigation data transmitted from the second vehicle, and
    reception of the radio wave in the first vehicle is performed by using the navigation data when the navigation data is transmitted from the second vehicle to the first vehicle subsequent to the reception in the second vehicle.

2. The relative inter-vehicle position calculation apparatus of claim 1, wherein
    the second vehicle calculates and transmits a rough position of the second vehicle by point positioning based on the radio wave received from the plurality of navigation satellites,
    the calculation unit calculates the detailed relative position of the first vehicle based on the rough position of the second vehicle when a relative distance from the rough position of the first vehicle based on point positioning by using the receiver to the rough position of the second vehicle based on point positioning, which has having a lesser degree of precision than a precision of the detailed relative position based on the carrier wave phase, is shorter than a standard distance, and
    the calculation unit refrains from calculation of the detailed relative position of the first vehicle relative to the second vehicle when the relative distance based on the rough positions is longer than the standard distance.

3. The relative inter-vehicle position calculation apparatus of claim 1, wherein
    the calculation unit refrains from calculation of the detailed relative position when there is no possibility of collision between the first vehicle and the second vehicle due to a structure of a traveling road.

4. The relative inter-vehicle position calculation apparatus of claim 1, wherein
    the calculation unit refrains from calculation of the detailed relative position when precision of positioning of the plurality of navigation satellites is lower than a threshold.

5. The relative inter-vehicle position calculation apparatus of claim 1, wherein
    the phase information reception unit further receives position data of the second vehicle transmitted from the second vehicle, wherein the position data has a precision that is equal to or greater than a precision of the detailed relative position calculated by the calculation unit, and
    the calculation unit determines a position of the second vehicle based on the received detailed relative position and the received position data.

6. A transmission apparatus disposed in the second vehicle and used to transmit information to the relative inter-vehicle position calculation apparatus of claim 1, the apparatus comprising:
    a phase determination unit for determining the carrier wave phase of the radio wave through reception of the radio wave from the plurality of navigation satellites; and
    a phase information transmission unit for transmitting the second carrier wave phase to the relative inter-vehicle position calculation apparatus after determination of the carrier wave phase by the phase determination unit.

7. A computer program product for use in a relative inter-vehicle position calculation apparatus disposed in a first vehicle, wherein the computer program product comprises one or more computer-readable storage media having computer-executable instructions for implementing a method for controlling a computer, and wherein the method comprises:
    providing a control unit having a phase determination unit, a phase information reception unit and a calculation unit;
    providing an inter-vehicle communication unit performing an inter-vehicle communication with a second vehicle; and
    providing a receiver receiving from a plurality of navigation satellites a radio wave; wherein
    the phase information reception unit receives, by the inter-vehicle communication unit, information on a carrier wave phase from a second vehicle that receives the radio wave from the plurality of navigation satellites and transmits the information on the carrier wave phase together with navigation data included in the radio wave, the received information on the carrier wave phase being determined as a first carrier wave phase;
    the phase determination unit determines the carrier wave phase of the radio wave through reception of the radio wave from the plurality of navigation satellites, the carrier wave phase being determined as a second carrier wave phase;
    the calculation unit calculates a detailed relative position of the first vehicle relative to the second vehicle based on a difference between the second carrier wave phase being determined by the phase determination unit based on the navigation data transmitted from the second vehicle and the first carrier wave phase being received by the phase information reception unit, and reception of the radio wave in the first vehicle is performed by using the navigation data when the navigation data is transmitted from the second vehicle to the first vehicle subsequent to the reception in the second vehicle.

8. A computer program product for use in a transmission apparatus that is disposed in the second vehicle and that transmits information to the relative inter-vehicle position calculation apparatus of claim 1, wherein the computer program product comprises one or more computer-readable storage media having computer-executable instructions for implementing a method for controlling a computer, and wherein the method comprises:

provoking a phase determination unit for determining the carrier wave phase of the radio wave through reception of the radio wave from the plurality of navigation satellites; and providing a phase information transmission unit for transmitting the carrier wave phase, as the second carrier wave phase, to the relative inter-vehicle position calculation apparatus after determination of the carrier wave phase by the phase determination unit.

9. A method of calculating a relative inter-vehicle position of a first vehicle from a second vehicle, the method comprising:

receiving in the second vehicle a radio wave from a plurality of navigation satellites, the radio wave including navigation data from the plurality of navigation satellites;

determining in the second vehicle a second carrier wave phase of the radio wave;

transmitting the navigation data from the second vehicle to the first vehicle together with the second carrier wave phase of the radio wave;

determining in the first vehicle a first carrier wave phase of the radio wave after receiving the navigation data from the second vehicle, the navigation data used for receiving the radio wave from the plurality of navigation satellites in the first vehicle; and calculating a relative position of the first vehicle relative to the second vehicle based on a difference between the first carrier wave phase and the second carrier wave phase.

10. The method according to claim 9 further comprising:

calculating and transmitting, from the second vehicle to the first vehicle, an estimate position of the second vehicle by point positioning based on the radio wave received from the plurality of navigation satellites;

calculating an estimate position of the first vehicle by point positioning based on the radio wave received from the plurality of navigation satellites;

calculating a relative distance of the first vehicle from the second vehicle based on the estimate position of the first vehicle and the estimate position of the second vehicle; and determining whether to calculate the relative position of the first vehicle relative to the second vehicle based on the relative distance of the first vehicle from the second vehicle having a lesser precision than a precision of the relative position of the first vehicle, wherein calculation of the relative position of the first vehicle relative to the second vehicle is performed if the relative distance of the first vehicle from the second vehicle is smaller than a standard distance.

* * * * *